Nov. 2, 1937.  L. B. KIMBALL  2,097,926
DEICING APPARATUS FOR AIRPLANES
Filed June 9, 1937
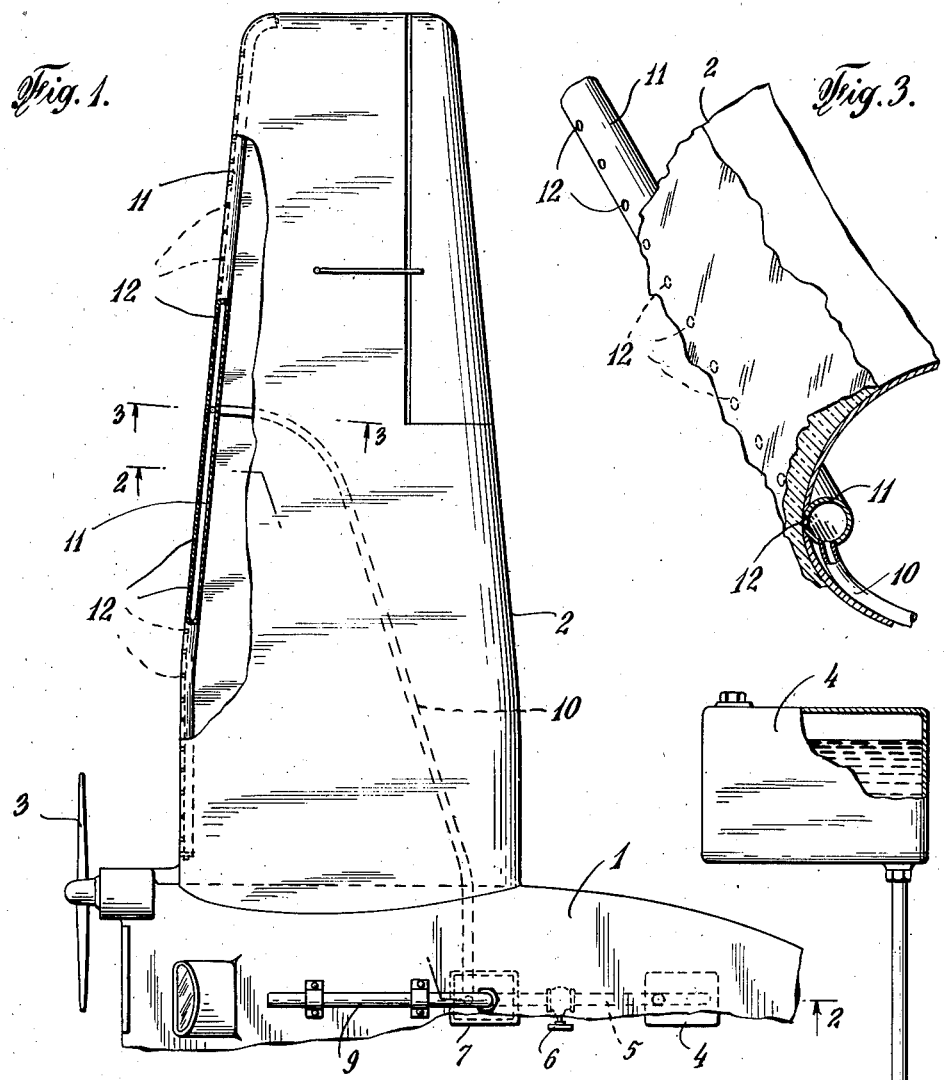
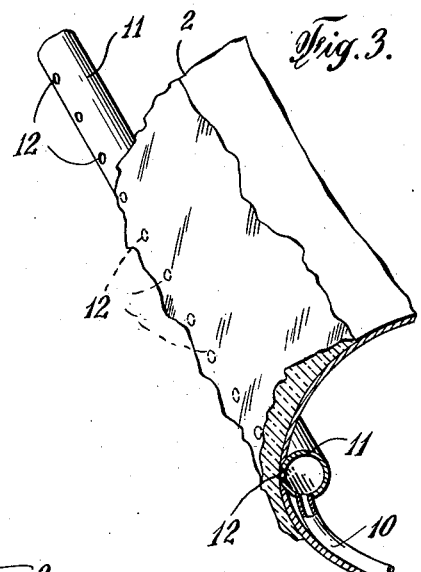
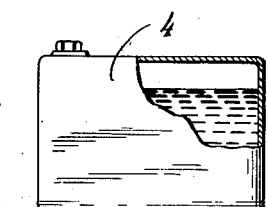
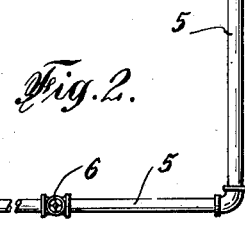
INVENTOR
Leo B. Kimball
BY
Edward W. Vaill,
HIS ATTORNEY Patented Nov. 2, 1937

2,097,926

UNITED STATES PATENT OFFICE 2,097,926

DEICING APPARATUS FOR AIRPLANES

Leo B. Kimball, New Haven, Conn., assignor to Fuel Development Corporation, a corporation of Delaware Application June 9, 1937, Serial No. 147,198

5 Claims. (Cl. 244—134)

The object of this invention is to provide simple and substantially automatic apparatus for removing ice that may tend to accumulate on exposed parts of airplanes such as on the wings thereof.

The arrangement set forth in this application provides apparatus that requires no special attention from the pilot or other operator of an airplane and when once put into operation will continue to act automatically to remove ice from exposed parts as long as the danger from accumulations may continue to be present, thus greatly increasing the safety of the passengers and the articles being carried by the airplane.

This object is attained by providing a liquid that has a lower freezing point than that of water that may be encountered during the flight of an airplane, in the form of rain, mist, sleet, fog or condensed moisture deposited and frozen to form ice on the parts of an airplane from any cause.

To free ice that may accumulate I have found that it is preferable to remove the ice after its formation rather than to apply an anti-freeze liquid to affected surfaces prior to ice forming thereon. Such removal is accomplished through the use of my invention by causing the liquid to pass between the surfaces to which the ice is attached and the ice itself, whereby the bond between the ice and said surfaces is destroyed or removed, thereby allowing the ice to be displaced and fall away upon the accumulation becoming sufficient to distort the normal shape of the wing surface dangerously, or other parts of an airplane. The airplane when freed from ice is in condition to continue on its course without danger from ice.

For a detailed description of one form of my invention, setting forth the manner of making and using it and the best mode of applying the principle thereof, reference may be had to the following specification and to the accompanying drawing forming a part thereof in which Fig. 1 is a plan view of a portion of an airplane, illustrating my invention applied to one wing thereof; Fig. 2 is a sectional view taken substantially on the line 2—2 Fig. 1 but showing the pipe for producing air pressure on the deicing liquid in full lines; Fig. 3 is an enlarged sectional view of an airplane wing taken substantially on the line 3—3 of Fig. 1.

Referring to the drawing, the numeral 1 indicates the fuselage of an airplane and 2 one wing thereof.

The numeral 3 indicates one of several propellers.

The numeral 4 indicates a tank or reservoir for the deicing liquid, 5 is a pipe leading therefrom, and provided with a control valve 6 that may be used to discontinue or regulate the flow of liquid through said pipe.

The pipe 5 enters a float valve chamber 7 that is provided with a float valve 8 that admits the deicing liquid to the chamber 7 to maintain the level of the liquid at its normal height. Connected with the top or upper part of the chamber 7 is a pipe 9 that extends to some suitable point above the fuselage or above the wing so that the air pressure due to the forward motion of the airplane will be active within the pipe and produce a corresponding pressure on the surface of the liquid in the chamber 8. Such a pressure may attain what corresponds to 20 inches of water pressure or even more. For that reason the height of the tank 4 should be sufficient to produce a greater hydrostatic pressure than is produced by the air pressure in the pipe 9 so that the liquid will always flow into the chamber 7 when the valve 8 is caused to open. That height should preferably be in the vicinity of 3 feet or 36 inches.

A pipe 10 is connected with the bottom or lower part of the chamber 7 and communicates with a pipe or conduit 11 that extends along the forward or advance portion of the wing 2 or other part of the plane where ice may accumulate. The outer surface of the pipe 11 is preferably placed flush with the advance surface of the wing 2 so that the normal design and efficient form of the wing will not be changed by its presence.

The pipe 11 is provided with a series of openings or small holes that will allow the escape of the deicing liquid when required so that the latter can spread over the surface of the wing or other part by capillary action or adhesion.

Such a liquid may comprise mixtures of various alcohols, such as ethyl alcohol, methyl alcohol, aniline, and other ingredients that may be found efficacious under particular conditions, the proportions thereof being determined by the preferences of the individual requirements. I have found, however, that the so-called anti-knock liquid described and claimed in my prior Patent No. 1,848,063, of March 1, 1932, is one type of deicing liquid that may be used, especially if the proportions of the ingredients are somewhat changed to cause the same to act more rapidly to dislodge ice. Such changes may comprise using about 50% (by volume) of ethyl alcohol, 5% butyl alcohol and 45% of aniline.

In that mixture methyl alcohol may also be used if preferred as it is less expensive than ethyl alcohol.

The operation of the above described apparatus may be stated as follows: The advancing motion of the airplane through the air produces a pressure in the pipe 9 and on the liquid in the chamber 7. In the absence of ice accumulations the same motion will produce an equal pressure at the holes 12 and in the pipes 11 and 10. That being the case, no liquid flows from the chamber 7 because the pressures thereon from above and below are substantially equal. The upper surface of the liquid in the chamber 7 is maintained by the float valve 8 approximately at or slightly below the horizontal level of the holes 12 in the pipe or pipes 11.

However, when ice accumulates over the holes 12 as indicated in Fig. 3, the pressure of the air through such holes, so obstructed, will be practically eliminated and only the pressure in the pipe 9 and on the liquid at 8 will be active, thus causing said liquid to be forced out of said holes. The liquid consequently is caused to spread between the surface of the wing and the inner surface of the ice, so that the bond between said surfaces is destroyed and the ice will consequently be dislodged and drop away.

It will therefore be seen that after the valve 6 has been opened by the pilot or other operator the action and supply of the deicing liquid will be automatically maintained.

It will be appreciated by one skilled in the art that pressure on the liquid in the chamber 7 may be produced in other ways, by being connected with some pressure device such as a pump that is in operation when the airplane is flying on its course, in a way similar to the action of the air pressure in the pipe 9, when that form of pressure means is used.

Having described this form of my invention, I do not wish to be understood as being limited to the details of form and arrangement of parts herein set forth, for various changes may be made by airplane engineers, without departing from the principle and scope thereof as set forth in the following claims.

What I claim and desire to protect by Letters Patent is:—

1. In deicing apparatus for airplanes, the improvements that comprise, a conduit having openings exposed to air pressure produced by forward motion of the airplane, for distributing a deicing liquid over the surface to be deiced, and means having an opening also so exposed for producing a positive pressure above atmospheric pressure on said deicing liquid, said distributing openings being made active by the accumulation of ice thereover, which eliminates said external air pressure.

2. In deicing apparatus for airplanes, the improvements that comprise, internal means for distributing a deicing liquid over the surface to be deiced, a chamber having a substantially constant level of deicing liquid therein, a pipe leading from said chamber to said distributing means, a device for producing an hydrostatic pressure on said liquid in said chamber and in said pipe, and means to counterbalance said pressure when said distributing means is not obstructed by ice.

3. In deicing apparatus for airplanes, the improvements that comprise, a conduit having openings for distributing a deicing liquid over the surface to be deiced, a chamber having a substantially constant level of deicing liquid therein, a pipe leading from said chamber to said conduit, and a device for producing an hydrostatic pressure on said liquid in said chamber and pipe, said openings affording a counterbalancing air pressure in said pipe when unobstructed by ice.

4. In deicing apparatus for airplanes, the improvements that comprise, a conduit having openings for distributing a deicing liquid over the surface to be deiced, a chamber having a substantially constant level of deicing liquid therein, a pipe leading from said chamber to said conduit, and a pipe connected with the upper portion of said chamber and having the opening at its outer end substantially at right angles to the relative motion of the air through which the plane is moving to produce air pressure in said chamber.

5. In deicing apparatus for airplanes, the improvements that comprise, a conduit that is located substantially flush with the normal surface of an airplane that it is desired to deice and having openings for distributing a deicing liquid over said surface, a chamber adapted to have a substantially constant level of deicing liquid therein, a relatively elevated reservoir for supplying said liquid to said chamber, a pipe leading from said chamber to said conduit, and a pipe connected with the upper portion of said chamber above said liquid and having the opening at its outer end substantially at right angles to the relative motion of the air through which the plane is moving, to produce air pressure in said chamber, whereby deicing fluid is forced out of said openings when the latter are obstructed by ice.

LEO B. KIMBALL.